No. 710,795. Patented Oct. 7, 1902.
F. MOSER.
NUT LOCK.
(Application filed June 24, 1902.)
(No Model.)

Witnesses
Robert Everett
C. M. Sweeney

Inventor
Fred Moser
by Henry Calver
Atty

UNITED STATES PATENT OFFICE.

FRED MOSER, OF AUBURN, NEW YORK, ASSIGNOR OF ONE-HALF TO FRANK A. HARMON, OF AUBURN, NEW YORK.

NUT-LOCK.

SPECIFICATION forming part of Letters Patent No. 710,795, dated October 7, 1902.

Application filed June 24, 1902. Serial No. 112,954. (No model.)

*To all whom it may concern:*

Be it known that I, FRED MOSER, a citizen of the United States, residing at Auburn, in the county of Cayuga and State of New York, have invented certain new and useful Improvements in Nut-Locks; and I do hereby declare the following to be a full, clear, and exact description of the invention, such as will enable others skilled in the art to which it appertains to make and use the same.

This invention relates to that class of nut-locks in which a locking-wire connected with the nut and having an arm or portion adapted to engage the slotted end of the bolt serves as the medium for locking the nut to the bolt; and the invention has for its object to provide a simple and convenient nut-lock of the character referred to.

In carrying the invention into effect the bolt is provided at its end or face with one or more transverse slits or slots, and the nut is provided at its outer face with an annular groove or recess surrounding a flange or lip having one or more notches, and the locking-wire has a circular body portion adapted to lie in the said annular groove or recess and having an arm bent inward to extend diametrically to the nut and bolt, so as to engage a recess in the nut, and a transverse slit in the end of the bolt to lock the two parts together.

Figure 1:
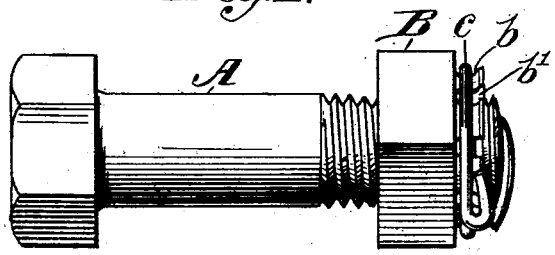
Figure 2:
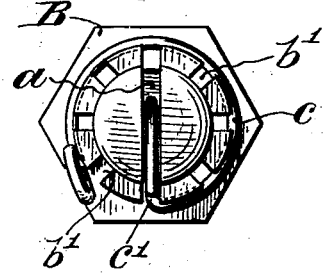
Figure 3:
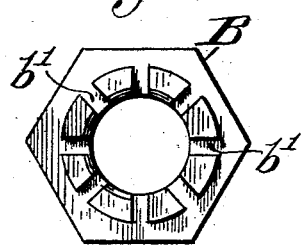
Figure 4:
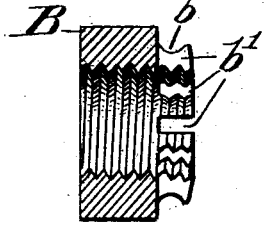
Figure 5:
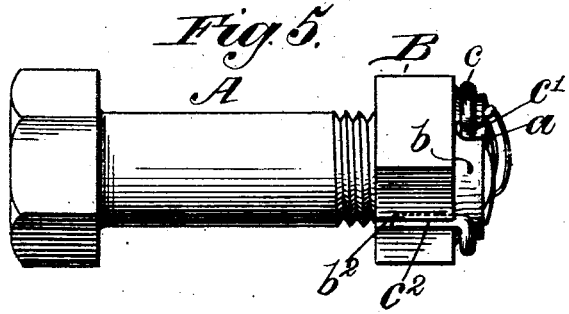
Figure 6:
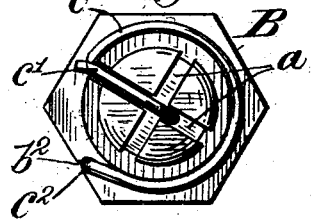
Figure 7:

Referring to the drawings, Figure 1 is a side view of a bolt and nut with my improved nut-lock applied thereto, and Fig. 2 is an end view of the same. Fig. 3 is a face view of the nut shown in Figs. 1 and 2, and Fig. 4 is a section thereof. Fig. 5 is a side view of a bolt and nut, illustrating a slightly-modified form of my invention; and Fig. 6 is an end view of the same. Fig. 7 is a detail perspective view of the locking-wire shown in Figs. 1 and 2.

Referring to the drawings, A denotes a bolt which may be of any suitable construction and which has a threaded portion on which fits a nut B. The bolt A is provided at its end with one or more transverse slits or slots $a$, and the nut B is cut away at its outer face to form a reduced portion which affords an annular recess or groove $b$, adapted to receive a locking-wire $c$, having a circular body portion received in the said groove or recess in the bolt and having also an inwardly-extending arm $c'$, which is disposed diametrically to the nut and bolt, so as to engage any one of a series of notches $b'$ formed in the outer face of the nut and enter a transverse recess $b$ in the outer end or face of the bolt. The extreme end of the wire forming the arm $c'$ is preferably bent back upon itself to form a loop or finger-piece which affords a convenient means for removing the locking-wire from the recesses or notches in the outer face of the nut and the end of the bolt when it is desired to unlock the nut.

In the form of my invention shown in Figs. 1 and 2 the locking-wire is retained in its annular groove or recess in the outer face of the bolt by its own resilience, as its circular body is of such size as to snugly embrace the notched flange afforded by the groove or recess in which the wire lies, while in the form of my invention shown in Figs. 5 and 6 one end $c^2$ of the locking-wire is received in a notch $b^2$ in the edge of the bolt, so as to hold the locking-wire in place.

From the foregoing it will be apparent that when the nut has been screwed onto the bolt to any desired position and the locking-wire is then applied thereto, with its inwardly-extending arm in engagement with a notch in the face of the nut and a slit or groove in the outer end of the bolt, the nut will be securely locked in place, so that it cannot become accidentally loosened or displaced by any jarring to which it may be subjected.

Having thus described my invention, I claim and desire to secure by Letters Patent—

1. The combination with a bolt provided with one or more transverse slits or slots in its outer end, of a nut having an annular groove or recess at its outer face and one or more notches in the flange or lip afforded by the said annular groove or recess, and a locking-wire having a circular body portion disposed in the said annular groove or recess at the outer face of the nut and having an inwardly-extending arm to engage a recess or notch in the reduced face portion of the nut and to lie in a slit or slot in the end of the bolt, to lock the nut in any desired position.

2. The combination with a bolt provided with one or more transverse slits or slots in its outer end, of a nut having an annular groove or recess at its outer face and one or more notches in the said annular groove or recess, and a locking-wire having a circular body portion disposed in the said annular groove or recess at the outer face of the nut and having an inwardly-extending arm to engage a recess or notch in the reduced face portion of the nut and to lie in a slit or slot in the end of the bolt, to lock the nut in any desired position, said inwardly-extending arm having a return-bend portion to afford a finger-piece for the convenient removal of the locking-wire when desired.

In testimony whereof I affix my signature in presence of two witnesses.

FRED MOSER.

Witnesses:
FRED R. RICH,
MARION C. ALDRICH.